3,015,602
Patented Jan. 2, 1962

3,015,602
METHOD OF RECLAIMING FIBERS FROM PARCHMENTIZED PAPER
Edward L. Taylor, Parchment, Mich., assignor, by mesne assignments, to KVP Sutherland Paper Company, Kalamazoo, Mich., a corporation of Delaware
No Drawing. Filed Sept. 5, 1958, Ser. No. 759,152
6 Claims. (Cl. 162—7)

This invention relates to a method of reclaiming fiber from parchmentized paper waste commonly designated "broke."

The main objects of this invention are:

First, to provide a method of reclaiming fiber from parchmentized paper waste or "broke" which may be economically practiced as to materials used and enable the use of machinery or equipment which are commonly standard equipment of paper mills.

Second, to provide a method of reclaiming fibers from parchmentized paper waste in which solvent materials are employed which are readily and economically available and the use of which is not injurious to the reclaimed fiber and do not constitute a hazard to workmen practicing the method.

Third, to provide a method of reclaiming fibers from parchmentized paper waste or broke which may be very economically practiced.

Objects relating to details and economies of the invention will appear from the description to follow. The invention is defined and pointed out in the claims.

It has been a common and a very general practice to salvage unparchmentized waste paper by reducing it to pulp for reuse in paper making, at least for inferior grades of paper and, generally stated, all that is required in such reclaiming is to treat printed papers for deinking and cook and beat the waste to reduce it to fiber form.

Literally millions of tons annually of parchmentized paper waste or "broke" have been burned or otherwise destroyed or disposed of as there has been no known means or method of salvaging such waste or to free the fibers thereof for reuse in paper making.

Applicant's invention relates to a method which may be economically practiced in paper mills and by equipment commonly included in paper mills such as cooking vats, beaters and the like.

While several amylose solvents may be employed in the applicant's method, as is hereinafter pointed out, a highly practical way or manner of practicing the applicant's method comprises the steps of cooking the parchmentized paper broke in a solution of water and ortho phosphoric acid in approximately the proportion of 2.6 pounds of 85% ortho phosphoric acid to 1500 gallons of water at a temperature of approximately 210° F. for a period of 2½ to 3 hours and thereafter beating until any sheeted or lumped masses of fibers are disintegrated and the fibers are free. The cooking caldrons and the beaters may be such as is commonly used by paper makers.

This treatment of the parchmentized broke stock results in dissolving of the amylose contained therein or the weakening of the amylose to such degree or extent as to substantially free the fibers from amylose and permit the separation thereof by beating and beating until the fibers are separated for reuse in the making of paper.

It will be understood that the parchmentized broke stock is commonly in the form of sheet fragments and after the cooking operation at least substantial portions or fragments may still retain its sheet form. However, it is readily disintegrated into its fibers by the beaters. It should also be understood that the cooking temperatures may be varied and that the cooking time varies with the cooking temperature variations. Also, that the proportions of the phosphoric acid to the water may be considerably varied in commercial practice, however, the proportions stated, cooking time and temperatures stated are commercially practical.

Another angle to be considered is that beaters vary in efficiency and the speed at which they are driven varies in different mills. However, the foregoing method is adapted for use of standard or commonly used types of paper mill cookers and beaters and it will be understood by those skilled in the art that beating time may vary as the cooking time is varied.

The applicant's method may also be practiced by the use of aluminum sulphate by cooking in a proportion of 100 pounds of parchmentized paper broke stock in a solution of water and aluminum sulphate $[Al_2(SO_4)_3]$ and in proportions of 11 pounds of the aluminum sulphate to 1500 gallons of water at a temperature of 210° F. and for a period of approximately 4 hours, and thereafter beating until any sheeted or lumped masses are disintegrated and the fibers freed. Aluminum sulphate is commonly known or designated in the paper making industry as "Papermakers Alum." Either of these methods of treatment result in the dissolving of the amylose content of the parchmentized paper, at least to such extent as to free the fibers or to permit their being freed by the beating step. Again, the cooking period may be considerably varied as will be understood by those skilled in the art of papermaking.

Commercial phosphoric acid $[H_3PO_4—85\%]$ and aluminum sulphate $[Al_2(SO_4)_3]$ are commonly available and other amylose solvents may be used.

The percentage of acid to water from the practical standpoint should be such as to dissolve the amylose in a reasonable cooking period, which in applicant's opinion, should be in the range of two to four hours. Substantially 95% of the fiber of the original paper, or paper before parchmentizing, is salvaged by applicant's method using phosphoric acid in proportions of approximately 2.6 pounds of the acid to 1500 gallons of water, the cooking temperature of 210° F. and a cooking time of 2½ to 3 hours. These figures are given for parchmentized paper of general commercial grade or quality.

Applicant desires to again point out that such parchmentized paper broke has been generally regarded as useless and pure waste, in fact, as a nuisance as it was necessary to dispose of it, usually by burning, and as has been pointed out millions of pounds have been destroyed yearly.

The terms "parchment paper" and "parchment broke" are commonly used and understood in the industry to mean parchmentized paper, and it should be understood that the term "parchmentized," used in this application, refers to paper commonly designated parchment paper. As has been pointed out, the applicant's method may be practiced by the use of machinery or equipment commonly regarded as essential apparatus or equipment by the making of paper and found in the average paper mill. The salvaging of the parchmentized paper broke by applicant's method is inexpensive both from the material cost and labor angles.

Having thus described the invention what is claimed as new and desired to secure by Letters Patent is:

1. The method of reclaiming fibers from parchmentized broke stock comprising the steps of cooking 100 pounds of broke in a solution of water and ortho phosphoric acid in approximately the proportions of 2.6 pounds of 85% ortho phosphoric acid to 1500 gallons of water at a temperature of approximately 210° F. for a period of 2½ to 3 hours, and beating until any sheeted or lumped masses of fibers are disintegrated and the fibers are freed.

2. The method of reclaiming fibers from parchmentized broke stock comprising the steps of cooking 100 pounds of broke stock in a solution of approximately fifteen hundred pounds (1500 lbs.) of water and one and one half pounds (1.5 lbs.) of eighty-five percent (85%) phosphoric acid at a temperature of approximately 210° F. for a period of 2½ to 3 hours, and beating until any sheeted or lumped masses of fibers are disintegrated and the fibers are freed and usable in the production of paper.

3. The method of producing cellulose fibers suitable for paper making from waste parchmentized paper stock including the steps of cooking the waste parchmentized paper stock in water containing ortho phosphoric acid in the proportion of approximately 2.6 pounds of 85% ortho phosphoric acid to approximately 1500 gallons of water until the amylose of the parchmentized stock has been dissolved or weakened to such degree as to substantially free the fibers from amylose and permit the separation thereof by beating, and beating until the fibers are separated.

4. The method of producing cellulose fibers suitable for paper making from parchmentized paper stock including the steps of cooking the one hundred pounds (100 lbs.) of parchment in a solution of approximately fifteen hundred pounds (1500 lbs.) of water and one and one half pounds (1.5 lbs.) of eighty-five percent (85%) phosphoric acid until the amylose of the parchmentized stock has been dissolved or weakened to such degree as to free the fibers or permit the separation thereof by beating, and beating until the fibers are separated to such degree as to permit their use in the making of paper by widely used or practiced methods and machines.

5. The method of reclaiming fibers from parchmentized broke stock comprising the steps of cooking 100 pounds of broke stock in a solution of water and aluminum sulphate $[Al_2(SO_4)_3]$ approximately the proportions of 11 pounds of aluminum sulphate to 1500 gallons of water at a temperature of approximately 210° F. for a period of approximately 4 hours, and beating until any sheeted or lumped masses are disintegrated and the fibers freed.

6. The method of producing cellulose fibers suitable for paper making from parchmentized paper stock including the step of cooking the parchmentized paper stock in water containing aluminum sulphate in the proportion of approximately 11 pounds of aluminum sulphate to approximately 1500 gallons of water until the amylose of the parchmentized stock has been dissolved or weakened to such degree as to free the fibers from the amylose and permit the separation thereof by beating.

References Cited in the file of this patent

UNITED STATES PATENTS

| | | |
|---|---|---|
| 441,462 | Barnes | Nov. 25, 1890 |
| 2,394,273 | Thomas | Feb. 5, 1946 |

OTHER REFERENCES

Britt: "Some Observations on Wet Strength Paper," The Paper Industry and Paper World, pages 37–38, April 1944.